United States Patent

Eagle, deceased et al.

[15] 3,678,827

[45] July 25, 1972

[54] MEANS FOR ADJUSTING CAMERA LOW-LIGHT SIGNAL IN ACCORDANCE WITH FILM EXPOSURE LATITUDE

[72] Inventors: John H. Eagle, deceased, late of Irondequoit, N.Y.; by Lee A. Eagle, executrix, Irondequoit, N.Y.; Lincoln Rochester Trust Company, executor, Rochester, N.Y.

[73] Assignee: Eastman Kodak Company, Rochester, N.Y.

[22] Filed: June 20, 1969

[21] Appl. No.: 835,316

[52] U.S. Cl. ............................95/10 CD, 95/31 CA, 95/64 D
[51] Int. Cl. ...........................................................G03b 7/12
[58] Field of Search ..............................95/10 C, 31 FS, 64 D

[56] References Cited

UNITED STATES PATENTS

| 3,125,939 | 3/1964 | Bundschuh et al | 95/31 FS UX |
| 3,270,650 | 9/1966 | Ernissee | 95/10 C X |
| 3,291,019 | 12/1966 | Eagle | 95/10 C |
| 3,425,326 | 2/1969 | Wasielewski | 95/31 FS X |
| 3,444,795 | 5/1969 | Nerwin | 95/10 C X |
| 3,482,497 | 12/1969 | Ernissee | 95/10 C |
| 3,500,731 | 3/1970 | Bresson et al. | 95/10 C |
| 3,505,937 | 4/1970 | Albedyll | 95/31 FS X |

*Primary Examiner*—Samuel S. Matthews
*Assistant Examiner*—Michael L. Gellner
*Attorney*—Robert W. Hampton and William C. Dixon, III

[57] ABSTRACT

A device is provided for adjusting a camera low-light-signal mechanism in accordance with the exposure latitude of film received in the camera. The device senses an exposure-latitude code on the film cartridge and adjusts the low-light-signal mechanism to energize the low-light signal only when appropriate for film of the indicated exposure latitude.

2 Claims, 2 Drawing Figures

JOHN H. EAGLE, DECEASED,
BY LEE A. EAGLE, EXECUTRIX, and
LINCOLN ROCHESTER TRUST CO., EXECUTOR,
INVENTOR BY William C. Dixon, III
Robert W. Hampton
ATTORNEYS JOHN H. EAGLE, DECEASED,
BY LEE A. EAGLE, EXECUTRIX, and
LINCOLN ROCHESTER TRUST CO., EXECUTOR,
INVENTOR.

MEANS FOR ADJUSTING CAMERA LOW-LIGHT SIGNAL IN ACCORDANCE WITH FILM EXPOSURE LATITUDE

BACKGROUND OF THE INVENTION

1. Field of the Invention

This invention relates generally to cameras, and particularly to a device for adjusting a camera low-light-signal mechanism in accordance with the exposure latitude of film received in the camera.

2. Description of the Prior Art

It is well known to provide a camera with a low-light signal that is energized at approximately ½ stop below the maximum exposure capability of the camera. This indicates the normally acceptable underexposure limit for commonly used transparency films. Print films, however, are capable of greater underexposure, e.g., at 1½ stops below the maximum exposure capability of the camera. Thus an adjustment of the low-light-signal energization level is appropriate when print films are being used instead of transparency films. Accomplishing this adjustment automatically is desirable to ensure maximum use of the exposure capability of the camera, particularly when the user is unaware of difference in film exposure latitude. No means for effecting such an adjustment is taught, shown, or suggested in the prior art known to applicant.

SUMMARY OF THE INVENTION

The present invention provides an improvement in a camera of the type that includes means for admitting scene light to expose film therein, means for signaling whether the intensity of scene light is within an acceptable range thereof, and means for receiving film carrying means having structural means thereon of a predetermined conformation in accordance with the exposure latitude of film carried thereby, the improvement comprising means cooperating with the structural means on the film carrying means, when the film carrying means is in the camera, for adjusting the signal means to correlate the acceptable range of scene light intensity with the exposure latitude of the film.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because certain parts of photographic and related apparatus are well known, the following description is directed in particular to those elements forming, or cooperating directly with, the present invention, elements that are not specifically shown or described herein being understood to be selectable from those known in the art.

Figure 1:
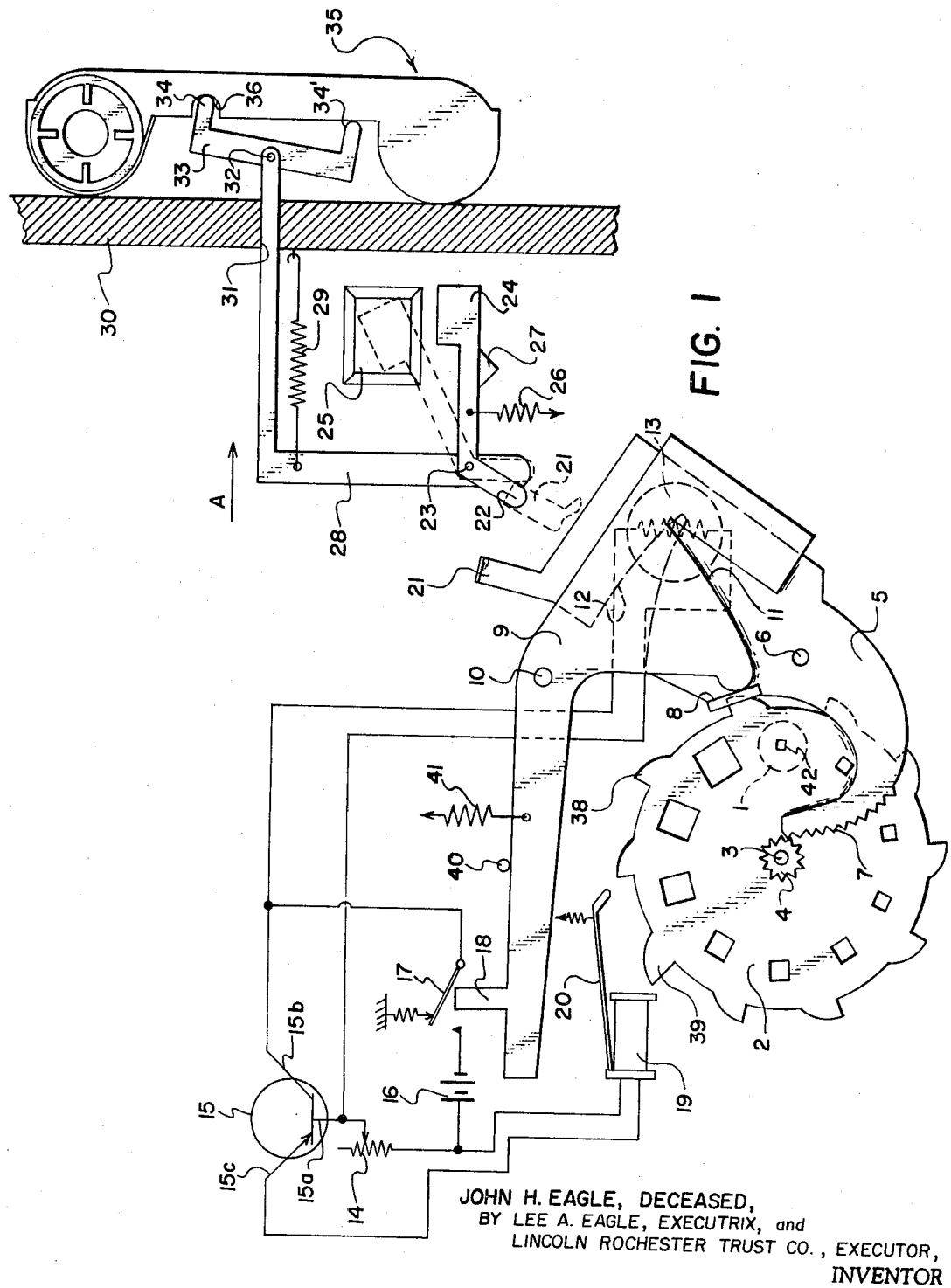
FIG. 1 is a schematic representation of the preferred embodiment, showing only those parts that are essential for an understanding of the invention.

FIG. 1 of the drawings illustrates the preferred embodiment of the invention as it is incorporated in a photographic camera of the automatic-exposure-control type, the camera having a lens 1 in alignment with a conventional shutter (not shown). A diaphragm aperture plate 2, containing apertures of different sizes, is mounted for rotation about a pin 3, and is rotated clockwise to the position shown at the end of each exposure under the control of any well known shutter-cocking mechanism (not shown). Mounted coaxially with plate 2 on pin 3 is a gear 4 which rotates simultaneously with plate 2. An activator 5 is mounted for rotation about a pin 6. A toothed edge 7 of activator 5 meshes with gear 4 and transmits rotational motion of plate 2 to activator 5. A raised portion 8 of activator 5 abuts a lever 9, which is mounted for rotation about a pin 10. Counterclockwise rotation of plate 2 about pin 3, in response to actuation of a shutter-release member (not shown), results in clockwise rotation of activator 5 about pin 6 and counterclockwise rotation of lever 9 about pin 10.

A cut-out section 11 of lever 9 and a cut-out section 12 of activator 5 are positioned to coact as a pair of variable masking blades for a photosensitive element 13, which may be a photoresistive device such as a photocell. Element 13 is electrically connected to the base and collector of a transistor 15. The transistor base 15a is also connected to the transistor collector 15b through a variable resistor 14, a source of electrical potential 16, and a switch 17. Switch 17 is held open against its normal bias by a projection 18 on lever 9, which is urged against a stop 40 by a spring 41. Transistor base 15a is connected to the tranSistor emitter 15c through variable resistor 14 and a solenoid 19. When aperture plate 2 is in the position shown, switch 17 is open and solenoid 19 is not energized. When solenoid 19 is energized, armature 20 thereof is moved inwardly against its normal bias to engage one of a plurality of ratchet teeth 38 on the periphery of plate 2.

A lever 22 is pivotable about a pin 23 which is fixed to a movable member 28. A finger 21 on activator 5 moves against lever 22, as activator 5 rotates clockwise, to rotate lever 22 counterclockwise against the bias of a spring 26. As lever 22 thus rotates counterclockwise, a flag 24 thereon is mOved upwardly into a viewfinder 25. When plate 2 returns to the position shown at the end of an exposure, spring 26 returns lever 22 to its rest position against a stop 27, thereby withdrawing flag 24 from viewfinder 25.

Figure 2:
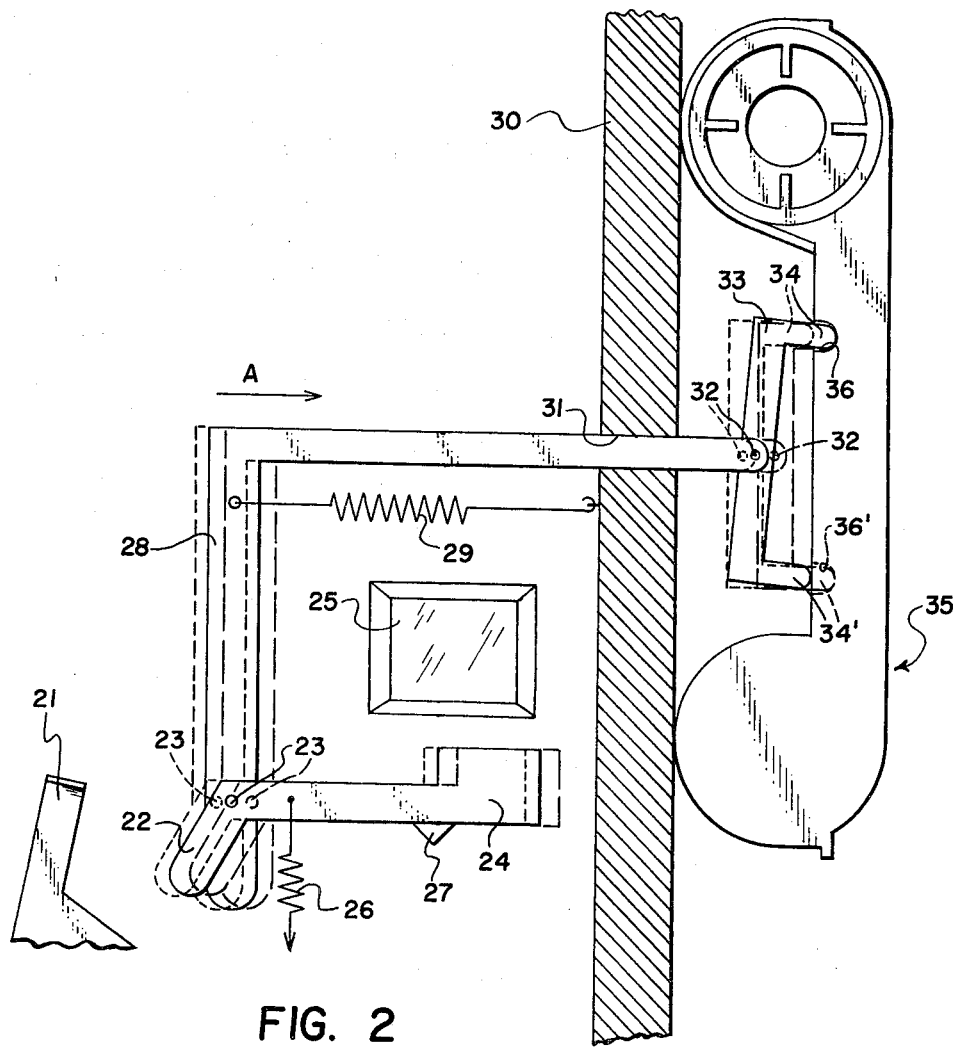
FIG. 2 is an enlarged view of a portion of the preferred embodiment illustrated in FIG. 1, showing the code sensing and signaling elements thereof in three alternative positions.

Member 28 is urged in the direction of arrow A through an opening 31 in an inner wall 30 of the camera by a spring 29 to provide a movable pivot, by meanS of pin 23, for lever 22. A rocker arm 33 is pivotally mounted on member 28 by a pin 32, arm 33 having a pair of sensing fingers 34 and 34' at its opposite ends. A film cartridge 35 containing film of a given exposure latitude has a code notch 36 in such a position as to receive sensing finger 34, when cartridge 35 abuts inner wall 30, to thereby permit pin 23 to move a predetermined distance toward wall 30 to its position shown in FIG. 1. Such position of pin 23 is shown in FIG. 2 as its middle position, wherein the corresponding positions of members 22, 24, 28, 32, 33, 34, and 34' are shown in solid lines. As illustrated in FIG. 2, a cartridge containing film of a greater exposure latitude would have a second code notch 36' in such a position as to receive sensing finger 34', when the cartridge abuts wall 30, to thereby permit pin 23 to move a greater distance toward wall 30 to its rightmost position, wherein the corresponding positions of members 22, 24, 28, 32, 33, 34, and 34' are shown in long broken lines. Similarly, a cartridge containing film of a lesser exposure latitude would have neither notch 36 nor notch 36' to receive either finger 34 or finger 34', when the cartridge abuts wall 30, thereby causing pin 23 to move away from wall 30 to its leftmost position, wherein the corresponding positions of members 22, 24, 28, 32, 33, 34, and 34' are shown in short broken lines.

In operation, the camera is aimed at the subject to be photographed, the subject being framed in viewfinder 25. In response to actuation of the shutter-release member, plate 2 begins to rotate in the counterclockwise direction from the position shown, in which the smallest aperture 42 is aligned with lens 1. As plate 2 thus rotates counterclockwise, gear 4 rotates actuator 5 clockwise. Raised portion 8 moves against lever 9 to rotate lever 9 counterclockwise, against the biasing influence of spring 41, causing projection 18 to be lowered and switch 17 to be closed under the influence of its normal bias. The current level through solenoid 19, however, is initially too low to attract armature 20. The activator 5 and lever 9 continue to rotate in opposite directions, cut-out portions 11 and 12 thereof unmask a continuously increasing area of the light-sensitive element 13, thereby producing a continuously increasing output current from element 13. When such current reaches a predetermined level, the current through solenoid 19 is high enough to actuate armature 20 to thereby engage one of the ratchet teeth 38 to prevent further rotation of plate 2. The aperture required for a correct photographic exposure is thus caused to be aligned with lens 1.

In the event that there is insufficient light to effect a satisfactory exposure, the required threshold current from element 13 is not reached, armature 20 is not actuated, and plate 2 continues to rotate until it is stopped by an enlarged tooth 39 thereon that engages armature 20. Before plate 2 stops rotating, finger 21 on activator 5 engages lever 22 and rotates lever 22 counterclockwise about pin 23 against the biasing influence of spring 26, causing low-light flag 24 to appear in viewfinder 25 and thereby warn the operator that insufficient illumination is available for a correct exposure.

Return of plate 2 to its position shown, by clockwise rotation under control of any well known shutter-cocking mechanism, rotates activator 5 counterclockwise and thereby removes finger 21 from lever 22. Lever 22 then rotates clockwise, under the influence of spring 26, and flag 24 is removed from viewfinder 25. Simultaneously, lever 9 rotates clockwise, under the influence of spring 41, until it comes to rest against stop 40, thereby causing projection 18 to open switch 17.

When cartridge 35 having code notch 36 is inserted into the camera so that the cartridge abuts inner wall 30, sensing finger 34 is received by notch 36 and member 28 is thereby permitted to move toward wall 30, under the influence of spring 29, to its position shown in FIG. 1 and its middle position shown in FIG. 2. As explained above, this causes lever 22 to be positioned closer to wall 30 and further from finger 21 than would be the case if the cartridge had no such notch. As plate 2 begins to rotate counterclockwise to align the correct aperture with lens 1, the camera operation is the same as described above in the event that sufficient illumination is available for a correct exposure. If sufficient illumination is not available, however, finger 21 must now travel further before engaging lever 22 to move low-light flag 24 into viewfinder 25. Such additional rotation of activator 5 corresponds to further rotation of plate 2 by the number of apertures corresponding to the increase in exposure latitude of the film contained in the cartridge having notch 36 over that of film contained in a cartridge not having such a notch.

While the above description relates to a bifingered mechanical device for sensing the presence and absence of one or two code notches on a film cartridge, it should be apparent that a single notch on the cartridge could be sensed by a single finger in lieu of the bifingered rocker arm shown. Alternatively, more than two notches could be sensed by multiple fingers arranged so that the sensing of a notch by any one finger would displace a main slide arm.

It should also be apparent that the device herein described has the advantage of preventing underexposure in the event that a notch is inadvertently omitted or misplaced. In such a case, the low-light signal would be actuated as intended for film of lesser exposure latitude.

The invention has been described in detail with particular reference to the preferred embodiment thereof, but it will be understood that variations and modifications can be effected within the spirit and scope of the invention.

What Is Claimed Is:

1. In a camera having a film exposure aperture, photoelectric means, and light admitting mean adjustable to a maximum condition for minimum scene light intensity, the camera being loadable by insertion of film carrying means having structural means thereon of a predetermined conformation in accordance with the exposure latitude of film carried thereby, the combination comprising:
 a. first and second movable blade means, said blade means disposed in covering relation to the photoelectric means;
 b. first motion transmitting means interconnecting the light admitting means and said first and second blade means for transmitting adjustment of the light admitting means to said first and second blade means to form a varying mask for said photoelectric means, and thereby cause the electrical output of the photoelectric means to vary in response to adjustment of the light admitting means;
 c. means responsive to said output for stopping adjustment of the light admitting means when said output reaches a predetermined level;
 d. movable signal means actuatable in response to adjustment of the light admitting means to its maximum condition;
 e. movable sensing means for sensing the predetermined conformation of the structural means on the film carrying means; and
 f. second motion transmitting means interconnecting said sensing means and said signal means for transmitting motion of said sensing means to said signal means to position said signal means in accordance with the exposure latitude of the film and thereby accordingly change said position of contact with said signal means.

2. The combination claimed in claim 1 wherein the structural means on the film carrying means includes at least one indented portion of the film carrying means; wherein said sensing means includes at least one finger for sensing said at least one indented portion; wherein said second motion transmitting means includes a movable member coupled to said at least one finger and pivotally supporting said signal means, said movable member and said at least one finger being urged by biasing means toward the film carrying means and into contact with said at least one indented portion to position said signal means, and thereby change said position of contact with said signal means, in accordance with the exposure latitude of the film.

* * * * *